United States Patent [19]

Tomita et al.

[11] 4,203,507

[45] May 20, 1980

[54] SHOCK ABSORBER

[75] Inventors: Takao Tomita; Nobuo Anno; Hitoshi Yamamoto, all of Saitama, Japan

[73] Assignee: Honda Giken Kogyo Kabushiki Kaisha, Tokyo, Japan

[21] Appl. No.: 964,611

[22] Filed: Nov. 29, 1978

Related U.S. Application Data

[63] Continuation-in-part of Ser. No. 792,203, Apr. 29, 1977, abandoned.

[51] Int. Cl.² ............................................ F16F 9/348
[52] U.S. Cl. ...................................... 188/317; 188/282
[58] Field of Search ...................... 137/513.3; 188/282, 188/317, 318, 320, 322

[56] References Cited

U.S. PATENT DOCUMENTS

| | | | |
|---|---|---|---|
| 2,732,039 | 1/1956 | Funkhouser et al. | 188/282 |
| 3,134,460 | 5/1964 | De Carbon | 188/317 |
| 3,470,986 | 10/1969 | Whisler | 188/317 X |
| 3,756,357 | 9/1973 | Graff et al. | 188/317 X |

Primary Examiner—Duane A. Reger
Attorney, Agent, or Firm—Lyon & Lyon

[57] ABSTRACT

A hydraulic shock absorber of the type having a cylinder and a piston with axial passages therethrough. The piston is mounted to slide within the cylinder. Valve plates having orifices therethrough are provided to control flow through the axial passages of the piston. Certain of the valve plates are situated to operate together with a variable effective orifice on the downstream side of the axial passages and to act with a fixed effective orifice as check valve plates when the flow is reversed. The composite valve thus defined offers a smooth and properly sloping velocity-resistance curve. The shock absorber also includes a foot valve assembly controlling flow between the interior of the cylinder and an annular oil reservoir outside the cylinder. The foot valve assembly may have two check valves for controlling flow through two sets of foot valve passages or it may employ a check valve spring which changes from a "V" shape to a flat shape to cover orifices in a check valve plate.

11 Claims, 21 Drawing Figures

SHOCK ABSORBER

RELATED APPLICATIONS

The present application is a continuation-in-part of U.S. Patent application Ser. No. 792,203, filed Apr. 29, 1977, now abandoned.

BACKGROUND OF THE INVENTION

This invention relates to hydraulic shock absorbers of the type used for land vehicles and is particularly directed to an improved shock absorber for motorcycles.

In recent years the social requirement of motorcycle safety has become more and more prominent. Improvements in vehicle stability have heretofore been made, but sometimes at the expense of riding comfort. Accordingly, it is an important object of this invention to provide an improved hydraulic shock absorber which results in both an improvement in vehicle stability and also in riding comfort.

In analyzing vehicle stability and comfort as affected by the shock absorbers of a vehicle suspension system, resort to representative damping characteristics curves is believed helpful. FIG. 1 of the drawings provides a comparison of a number of such representative curves. Conventional damping systems for motorcycles generally exhibit a damping capacity characteristics curve labeled "B" in FIG. 1. A system employing dampers exhibiting the characteristics of curve "B" transmit a trembling feeling to the rider's hands when running on a rough surface. The low speed resistance force is higher than desirable and the relative discontinuity at the point designated "I" tends to transmit strong impacts in the continuous movement of the system. The type of rough surfaces effecting such vibration includes worn paved roads, roads full of repair work and roads with rain grooves. As such conditions can be encountered for extended periods of time, such an unfavorable response curve can result in increased operator fatigue.

In recognition of such deficiencies in the more conventional shock absorber mechanisms, efforts have been made to create a more favorable damping capacity characteristics curve. To this end, French Pat. No. 1,342,210 issued to Societe Anonyme Andre Citroen discloses a device which employs multiple mechanisms to arrive at a total effect having a damping capacity characteristics curve indicated by curve "C" in FIG. 1. The addition of a plate valve in the Citroen device does, in a somewhat discontinuous manner, eliminate the sharp rise in resistance at low piston velocities. The sharp discontinuities shown at points "II" and "III" in curve "C" of FIG. 1 result in strong impacts to the continuous movement of the damper rod. The strong impacts induce large vibrations of the handlebars or seat of a motorcycle and trembling feelings on rough road surfaces similar to what is experienced by the abrupt slope change of curve "B" at point "II" in FIG. 1.

Using known techniques curve "A" of FIG. 1 may also be achieved. However, this curve lacks damping capacity in the range of low piston speeds and high damping force at midrange. The lack of damping at low range piston speeds reduces handling responsiveness while the large damping at the mid-range piston speeds detracts from operator comfort. Consequently, the more conventional systems heretofore employed for motorcycle shock absorbers have compromised one advantageous characteristic for another.

SUMMARY OF THE INVENTION

The present invention is directed to a hydraulic shock absorber which provides a continuous damping capacity characteristics curve with appropriate low-range, mid-range and high-range piston speed damping capacity. The damping capacity characteristics curve of the present invention may be compared with that of the prior art devices in FIG. 1. Line "D" represents the curve of the present invention. A review of FIG. 1 indicates that there is no discontinuity in line "D" whereas curves "B" and "C" exhibit abrupt damping changes at points "I", "II" and "III". The level of damping is found not to approach the undesirable level found on curve "B" during the low-range operation. Also, the high range of curve "D" is well below the undesirable performance of damping curve "A".

To achieve the advantageous damping curve of the present invention, a composite valve is used which provides a continuous transition sequentially between a number of valve plates having different effective damping characteristics. This composite valve is arranged such that it becomes fully open at higher piston velocities to enable a second valve to control damping. This opening of the composite valve occurs across a range of piston velocities such that a continuous transition from the composite valve to the separate high-range valve can be achieved.

The advantages of the design of the present invention include a lack of any point of large inflection in the damping capacity characteristics curve. This results in lower vibrations transmitted to the steering or the frame, producing increased riding comfort and less fatigue. The present device also can provide a wide range of damping capacities by adjusting the orifice diameters and the shapes and thicknesses of the valve plates. These changes can be made to accommodate vehicles of differing weights and usages.

Accordingly, it is an object of the present invention to provide a hydraulic shock absorber of improved construction.

It is a further object of the present invention to provide a hydraulic shock absorber having no points of major inflection on the damping capacity characteristics curve of the device.

It is yet another object of the present invention to provide a hydraulic shock absorber employing a composite valve which can be adjusted to provide a number of different damping characteristics by replacing individual orifice elements of the composite valve.

Other and further objects and advantages will appear hereinafter.

DETAILED DESCRIPTION OF THE PREFERRED EMBODIMENT

Figure 2A:
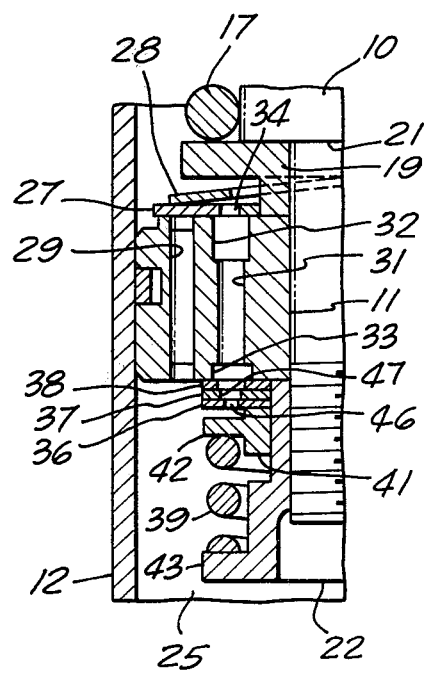
FIG. 2a is a detailed longitudinal sectional view showing a portion of a piston of the embodiment of FIG. 2.
Figure 2:
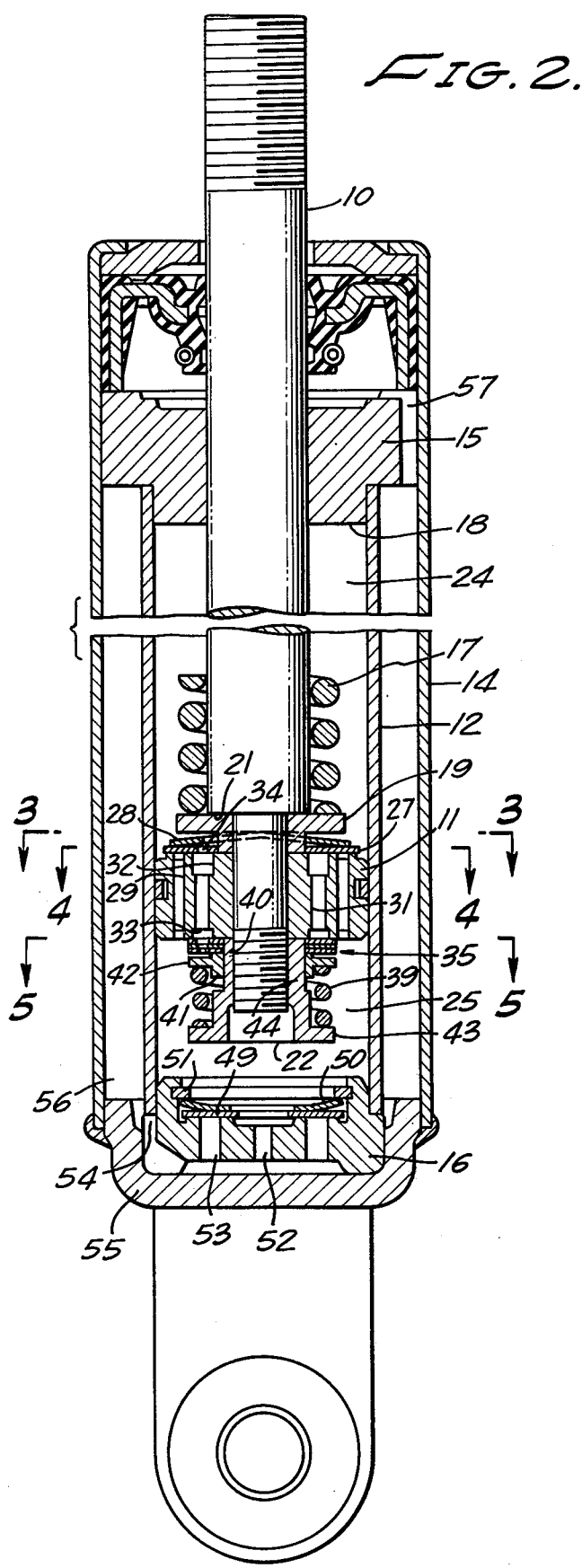
FIG. 2 is a longitudinal sectional view showing a shock absorber comprising a preferred embodiment of this invention.
Figure 3:
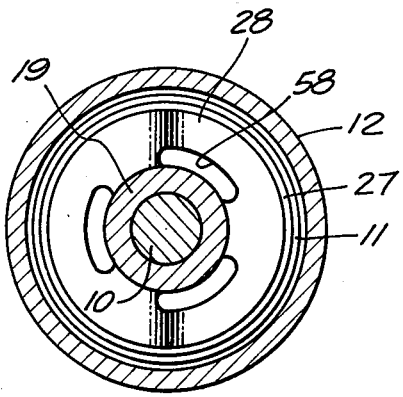
FIGS. 3, 4 and 5 are transverse sectional views taken substantially on the lines 3—3, 4—4 and 5—5, respectively, as shown in FIG. 2.
Figure 4:
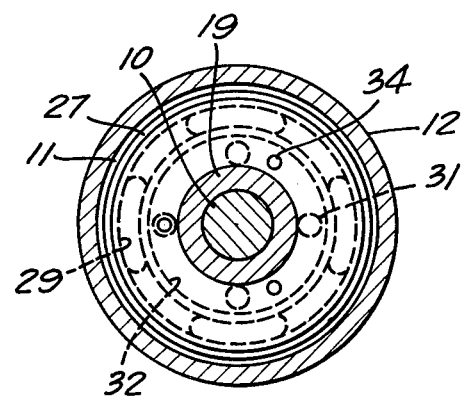

Referring to the drawings, FIG. 2 illustrates a hydraulic shock absorber of the piston and cylinder type. The piston rod 10 has a piston 11 fixed thereto which is slidably received within the cylinder 12. The cylinder 12 is fixed within the reservoir tube 14 and is aligned at its opposite ends by means of the rod guide 15 and the foot valve body 16. A bumper spring 17 encircling a portion of the piston rod 10 contacts the lower surface 18 of the rod guide 15 to limit upward movement of the piston rod 10 with respect to the cylinder 12 and the reservoir tube 14. The lower end of the bumper spring 17 rests on the valve guide sleeve 19, which is clamped between the shoulder 21 and the piston 11 by means of the nut 22 connected by threads to the lower end of the piston rod 10.

In accordance with this invention, novel means are provided for controlling flow of hydraulic oil between the annular space 24 above the piston 11 and the space 25 below it. In the form of the invention shown in FIGS. 2 through 8, a flat annular check valve plate 27 is held in contact with the upper surface of the piston 11 by means of the "V" shaped spring 28. When not stressed, one half of the spring lies in one plane, and the other half lies in another plane. Passages 29 extending through the piston 11 are closed by the check valve plate 27. The annular check valve plate 27 is sized to fit about the reduced portion of the piston rod 10 to hold the valve plate 27 in a central position. However, the valve plate 27 may freely rotate about the piston rod 10 without affecting the operation of the device.

Main passages 31 also extend axially through the piston 11. The main passages 31 are shown in this embodiment to be three in number. However, more could be employed as these passages do not affect the damping characteristic of the device. An annular groove 32 extends about the upper surface of the piston 11 interconnecting the main passages 31. A second annular groove 33 extends around the bottom surface of the piston 11 interconnecting the other end of the main passages 31.

The annular check valve plate 27 includes three orifices 34 which are positioned to communicate with the annular groove 32. The orifices 34 provide a fixed means for controlling hydraulic flow from the annular space 24 to the space 25 through main passages 31. These orifices 34 are provided for relatively high range piston velocities as will be further discussed below.

Figure 5:
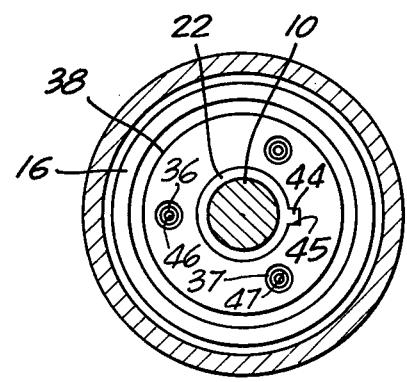

Below the piston 11 and wholly covering the annular groove 33 is a composite valve 35 comprised in this preferred embodiment of annular check valve plates 36, 37 and 38. These annular check valve plates 36, 37 and 38 are biased against the underside of the piston 11 by means of a check valve spring 39. The check valve spring 39 includes a spring guide 40 including a hub 41 and a radially extending flange 42. The radially extending flange receives the upper end of the check valve spring 39 to force the hub 41 axially against the annular check valve plates 36, 37 and 38. The radially extending flange 42 is spaced from the upper end of the hub 41 to provide free movement to the outer portions of the annular check valve plates 36, 37 and 38. The nut 22 includes a radially extending flange 43 receiving the other end of the check valve spring 39. The nut 22 includes an axial extending key 44 to mate with corresponding keyways in the spring guide 40 and the annular check valve plates 36, 37 and 38. The key 44 and keyway 45 in these check valve plates are best seen in FIG. 5.

Figure 12:
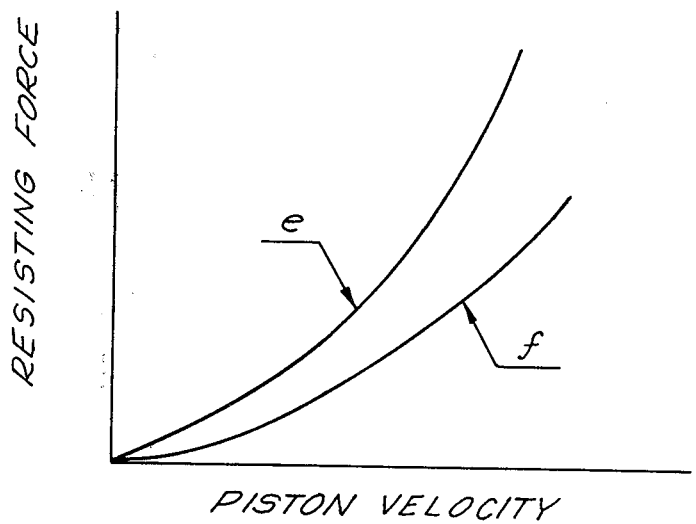
FIG. 12 is a graph illustrating characteristic damping capacity curves for fixed orifice diameters.
Figure 13:
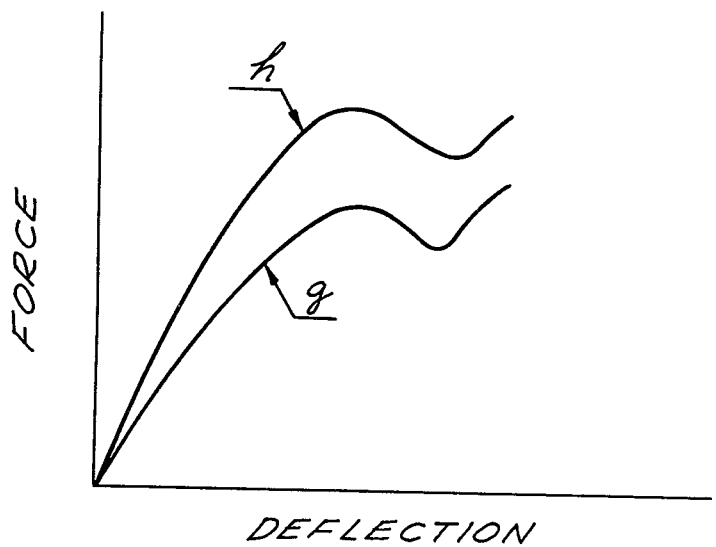
FIG. 13 illustrates characteristic spring constants for valve plates.

The composite valve 35 is designed to provide a continually varying orifice diameter through the use of the individual annular check valve plates 36, 37 and 38. To this end, each of the check valve plates 36, 37 and 38 vary in two respects. First, the plates are of increasing thickness. Consequently, the axial deflection of the outer rim of each plate relative to the corresponding center section exhibits different spring characteristics for each plate. The spring rates for two succeeding plates are illustrated in FIG. 13 as curves g and h. Second, each of the plates 36, 37 and 38 includes three orifices. These orifices are all aligned as can be best seen in FIG. 5. The thinnest check valve plate 36 includes the smallest orifices 46. The plate 37 of medium thickness employs larger orifices 47. The thickest plate 38 employs still larger orifices. Orifices of different diameters naturally exhibit different damping characteristics. Two characteristic curves e and f are illustrated in FIG. 12.

Figure 6:
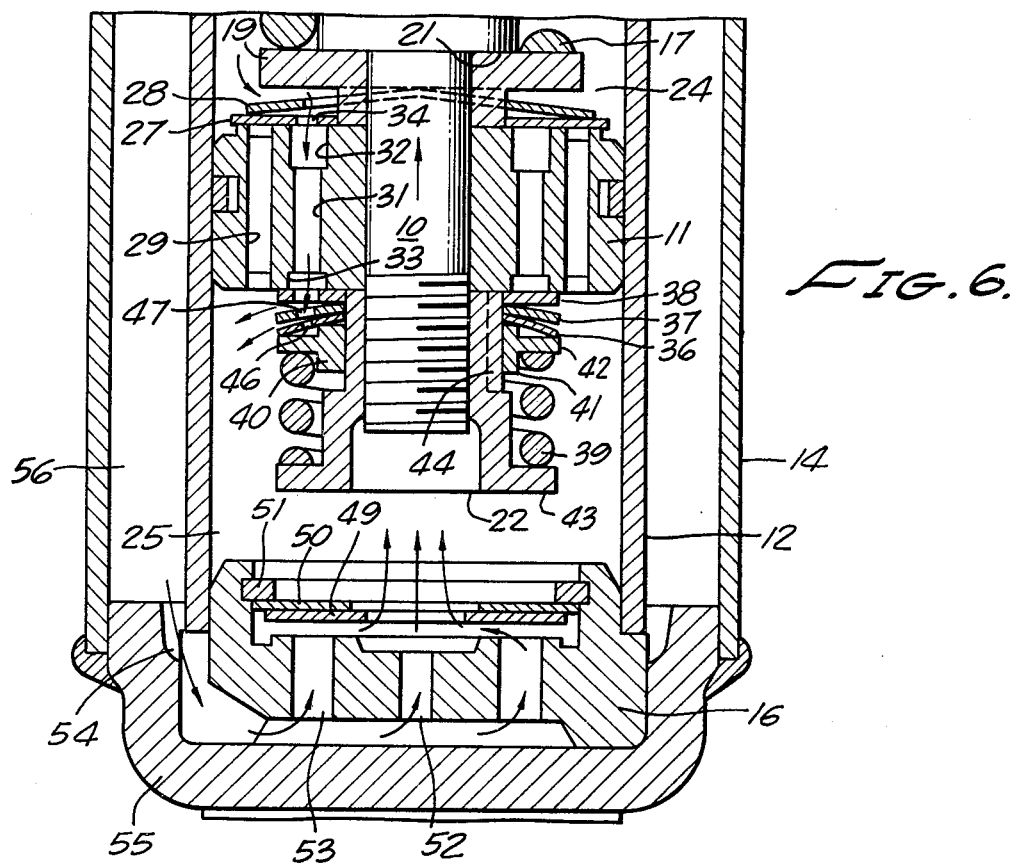
FIG. 6 shows a portion of the device of FIG. 2 on a larger scale and illustrating the directions of oil flow during mid velocity rebound.
Figure 7:
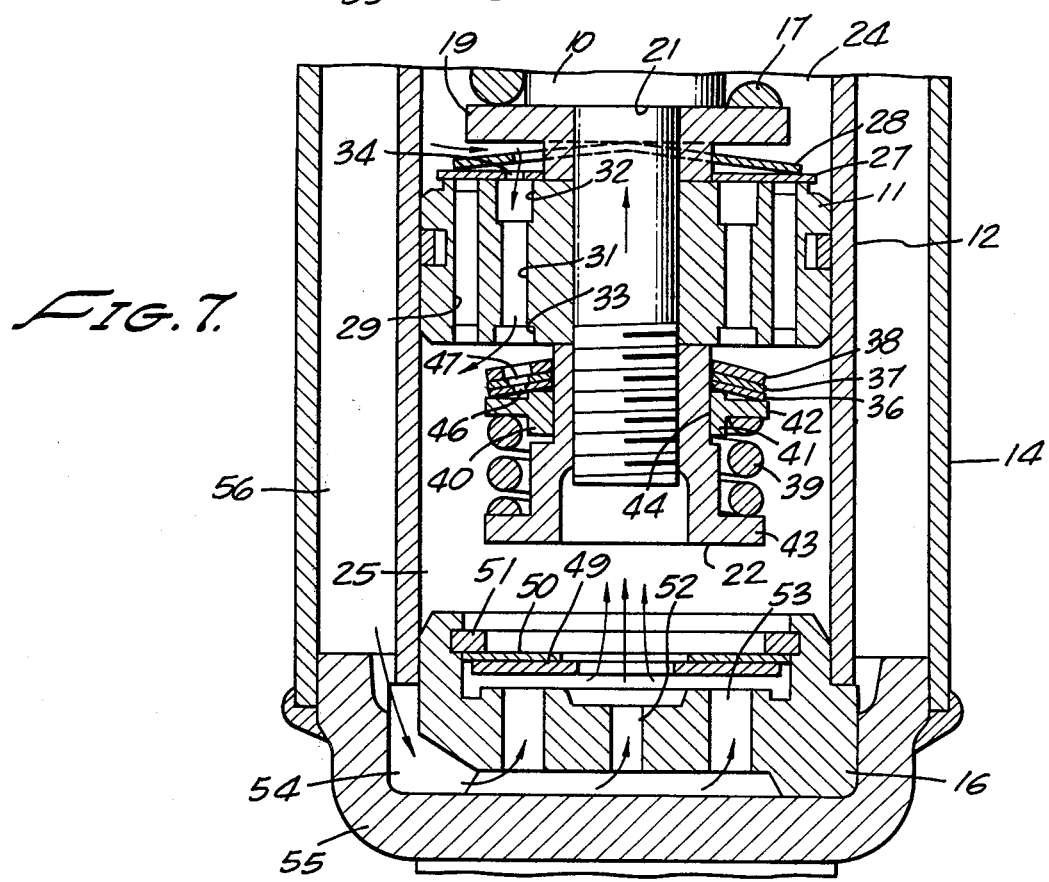
FIG. 7 shows a portion of the device of FIG. 2 on a larger scale and illustrating the directions of oil flow during high velocity rebound.
Figure 11:
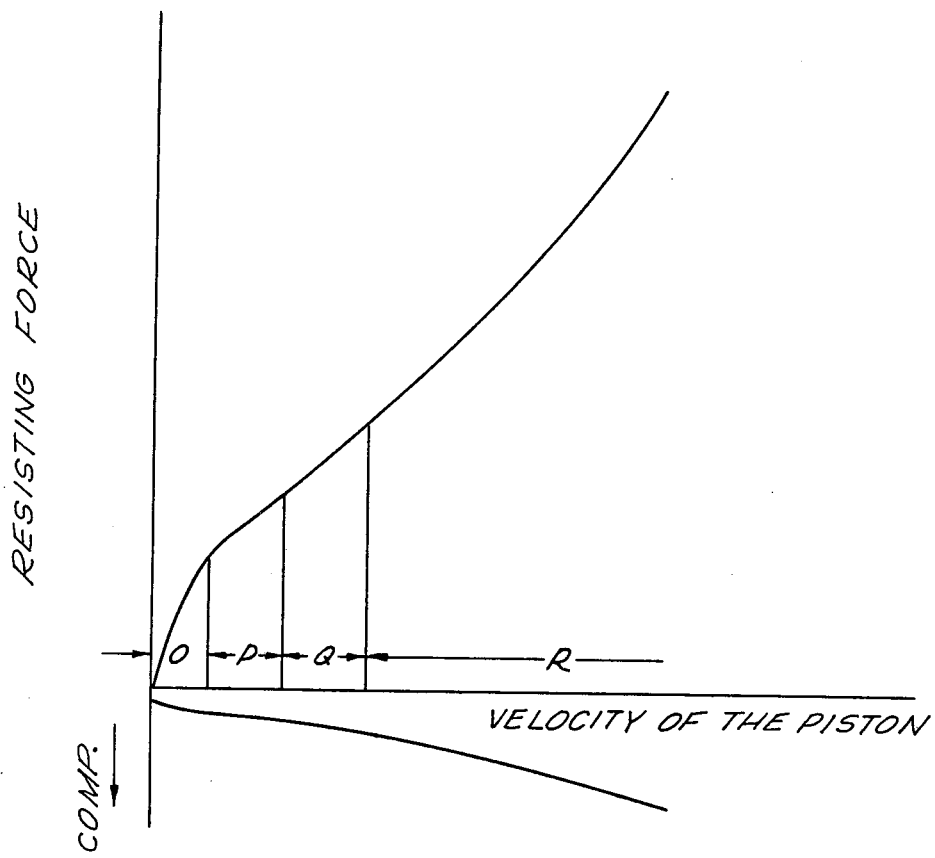
FIG. 11 is a performance curve of the preferred embodiment of the present invention in terms of piston velocity versus damping force.
Figure 14:
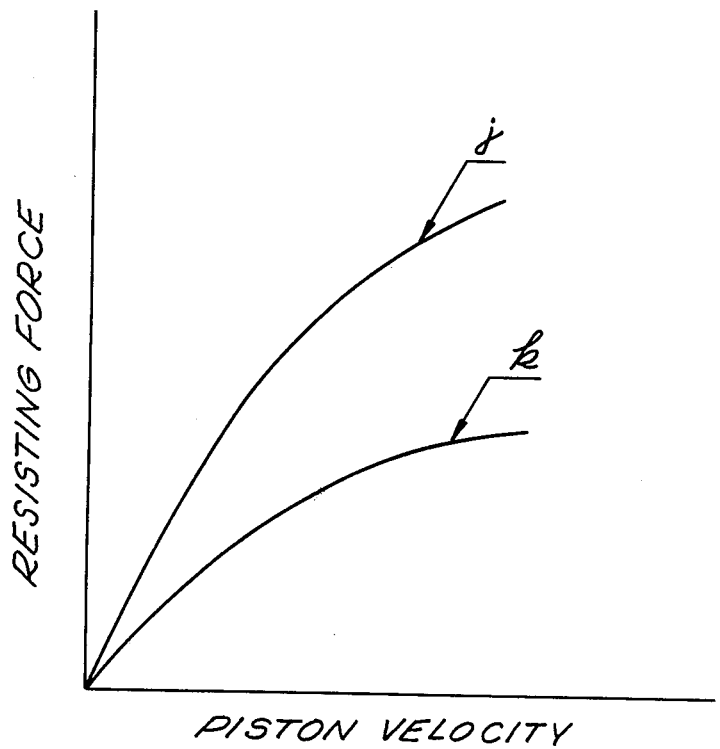
FIG. 14 illustrates the composite damping capacity curves for valve plates of the present invention operating independently rather than in a composite design.

The effect of both the spring constant and the characteristic orifice resistance combine to act on individual ones of the annular check valve plates 36, 37 and 38 to provide individual overall damping characteristics curves such as those shown by curves j and k of FIG. 14. Curve j of FIG. 14 is the composite damping characteristics curve for curves e and g while curve k is the result of the parameters of curves f and h. By placing the three check valve plates 36, 37 and 38 together and in the order discussed, a composite valve having a separate and distinct damping characteristics curve is developed. The thinnest plate 36 having the smallest orifices 46 is first to be effected by piston movement within the enclosing cylinder. At very low piston speeds, this first annular check valve plate 36 provides the damping characteristics curve for the overall shock absorbing mechanisms. As piston speeds increase this thin plate 36 is deflected downwardly by the force of the hydraulic fluid directed through the main passages 31. Hence, the plate 37 of medium thickness becomes more influential in the composite valve 35 so as to become a major factor in determining the damping characteristics curve of the overall system. By the same procedure, annular check valve plate 38 is also employed. Looking at FIG. 11, portions of the damping characteristic curve labelled O, P and Q are primarily influenced by the annular check valve plates 36, 37 and 38 respectively. Such a condition as just described is illustrated in FIG. 6 where the partially deflected check valve plates 36, 37 and 38 exhibit a combined effect on the damping characteristics of the overall shock absorbing mechanism.

The check valve spring 39 is designed to experience substantial compression at a level of piston speed where the annular check valve plates 36, 37 and 38 have been largely deflected from their rest position. As the check valve spring 39 is compressed, the composite valve 35 acts somewhat like a conventional check valve plate in allowing greater and greater unrestricted flow of hydraulic fluid through the main passages 31. Once this has occurred, the composite valve 35 has little influence on the damping characteristics curve. Rather, annular check valve plate 27 provides the resistance to flow of hydraulic fluid through the rebounding piston. Thus, flow is controlled by orifices 34. This final mode completes the damping characteristics curve shown in FIG. 11 as portion R.

Figure 1:
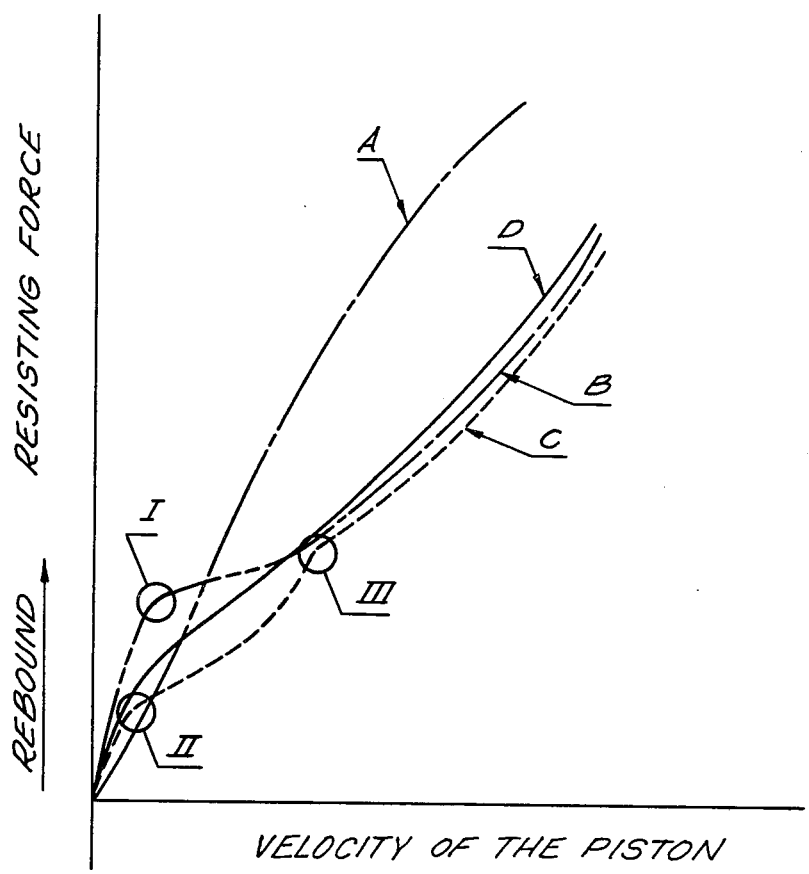
FIG. 1 is a series of curves representing the performance of a variety of shock absorbers including that of the present invention.

In designing a piston arrangement of the present invention, a desired curve must first be defined. A limited number of valve plates having the appropriate variations in thickness and orifice size can then be assembled in combination with an annular check valve plate known to have the desired high range piston velocity damping characteristics. The appropriate thicknesses and orifice sizes may be impirically determined. Furthermore, additional plates in the composite valve 35 may be employed to help smooth out sudden changes of damping capacity such as exhibited by the prior art curves A through C illustrated in FIG. 1.

Figure 10:
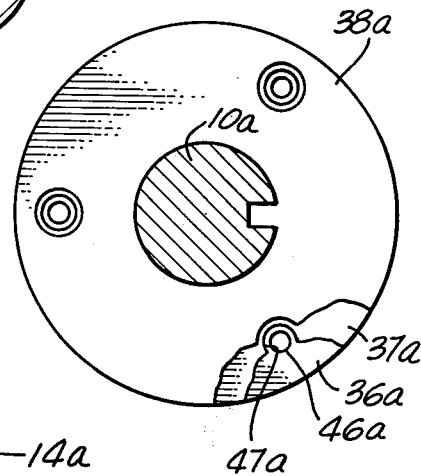
FIG. 10 is a transverse sectional view taken substantially on the lines 10—10 of FIG. 9.
Figure 9:
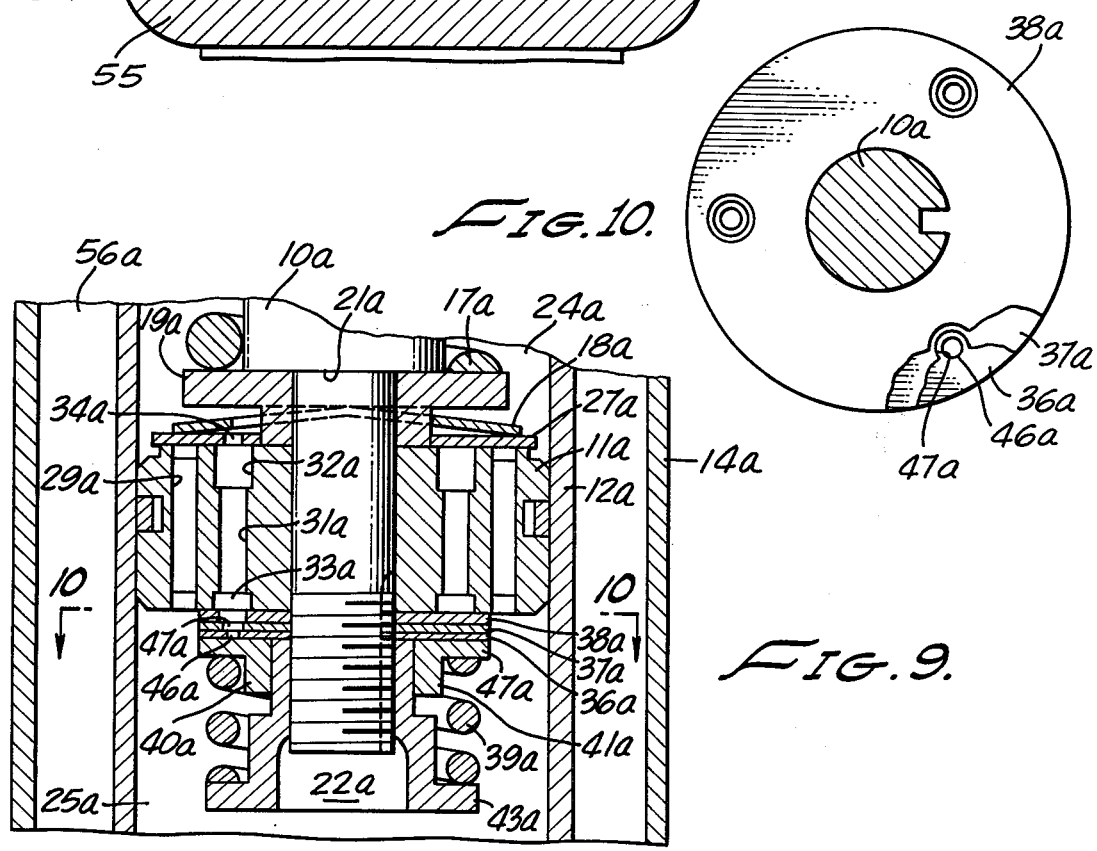
FIG. 9 is a longitudinal sectional view of a shock absorber comprising a second preferred embodiment of this invention.

A second preferred embodiment of the piston assembly is illustrated in FIGS. 9 and 10. This embodiment differs from that illustrated in FIG. 2 in that the inner peripheries of the valve plates 36a, 37a and 38a are fixed by the stopper nut 22a. In operation, the spring guide 40a must lift slightly from the annular check valve plate 36a. At this time, the damping capacity characteristics curve is determined by the orifice 46a. As piston speeds increase, the normal progression of the composite valve is experienced. The valve plates are allowed to deform to a substantial degree by pushing the spring guide 40a and check valve spring 39a away from the piston 11a. At this time, the check valve plate 27a with its orifices 34a become effective as in the first preferred embodiment.

The foot valve assembly includes the foot valve body 16, the check valve plate 49, the valve spring 50, and the retainer 51. The foot valve body 16 is provided with a central orifice 52 as well as a plurality of passages 53. Passages 54 in the lower cap 55 establish communication between the annular reservoir 56 and the passages 53 and orifice 52 in the foot valve body 16. The annular reservoir 56 is vented through the passage 57 in the rod guide 15.

As shown in FIG. 6, hydraulic oil passes from the annual chamber 24 through the openings 58 in the "V" shaped spring 28 and the orifices 34 in the check valve plate 27 into the annular oil passage 29 and through the main passages 31 in the piston 11. The disc valve 35 allows oil to flow into the space 25.

Also, during the rebound stroke shown in FIG. 6, hydraulic oil flows from the annular reservoir 56 through the openings 54 and up through the orifice 52 and passages 53 in the foot valve body 16. The check valve 49 moves upward against the force of the spring 50 so that oil passing through the foot valve body 16 reaches the space 25. When higher piston speeds are encountered, the composite valve 35 is caused to fully open as can best be seen in FIG. 7.

Figure 8:
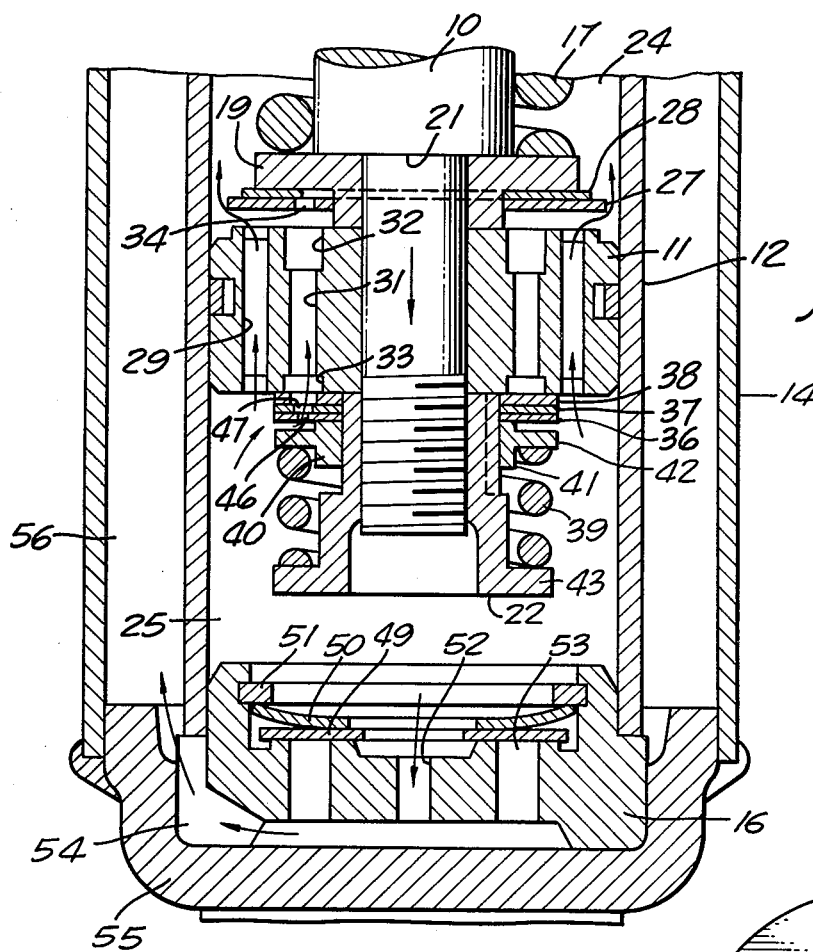
FIG. 8 is a view similar to that of FIG. 7 showing the directions of oil flow during the compression stroke.

During the compression stroke of the piston 11, as shown in FIG. 8, hydraulic oil flows from the space 25 to the annular chamber 24. The check valve plate 27 moves against the force of the spring 28 so that flow occurs through passages 29 in the piston 11. The main passages 31 are closed by the composite valve 35 with the exception of the small orifices 46.

During descent of the piston on the compression stroke, the check valve 49 closes the passages 53 so that all of the oil flowing from the space 25 into the annular reservoir 56 must pass through the central orifice 52.

Figure 15:
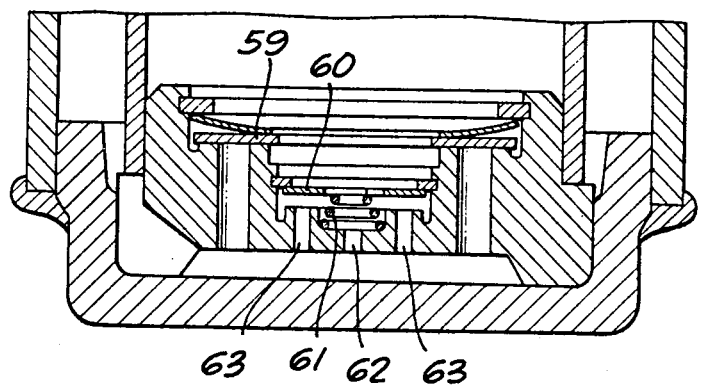
FIG. 15 is a sectional elevation of a preferred foot valve assembly for achieving the characteristics set out in the curves of FIG. 11.
Figure 16:
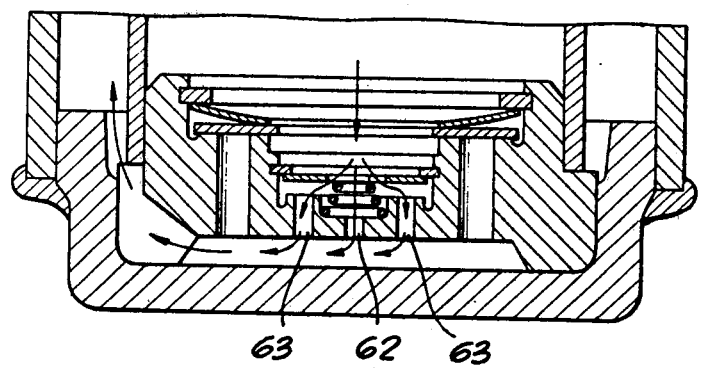
FIG. 16 is a view similar to FIG. 15 showing the directions of flow of oil during the compression stroke.
Figure 17:
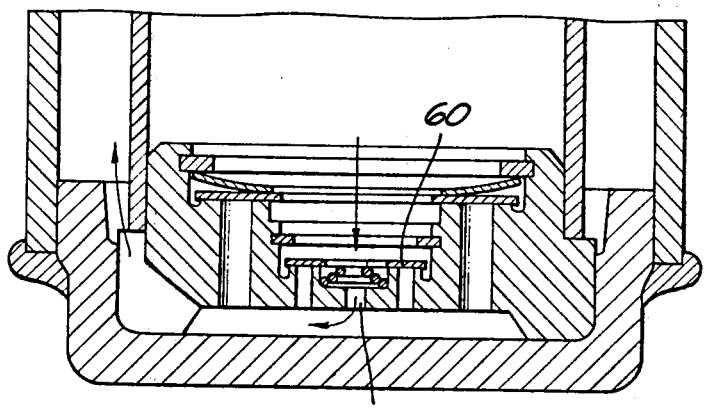
FIG. 17 is a view showing the directions of oil flow during the compression stroke.

The foot valve shown in FIGS. 15, 16 and 17 employs a spring-urged check valve 59 as well as a spring urged orifice control valve 60. The spring 61 for the valve 60 is chosen to produce any suitable loading, and in this way any desired piston speed can be established at which the damping operation begins. When the piston speed during the compression stroke is slower than the established value, oil flows through the small orifice 62 as well as through the larger passages 63, as shown in FIG. 16. When the piston speed during the compression stroke reaches the established value, the orifice control valve closes, as shown in FIG. 17, to require all of the oil to pass through the small orifice 62. Thereafter, the damping force characteristic rises sharply.

Figure 18:
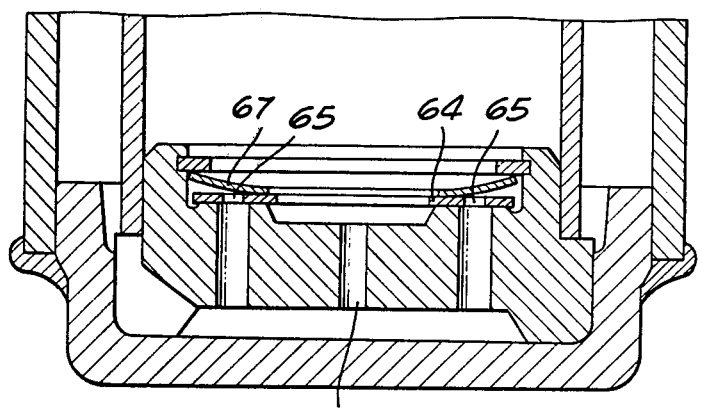
FIG. 18 is a sectional elevation showing a modified form of foot valve assembly.
Figure 19:
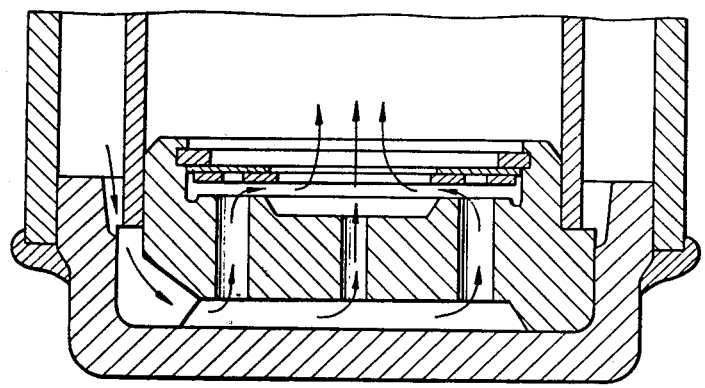
FIG. 19 is a view similar to FIG. 18 showing directions of oil flow during the rebound stroke.
Figure 20:
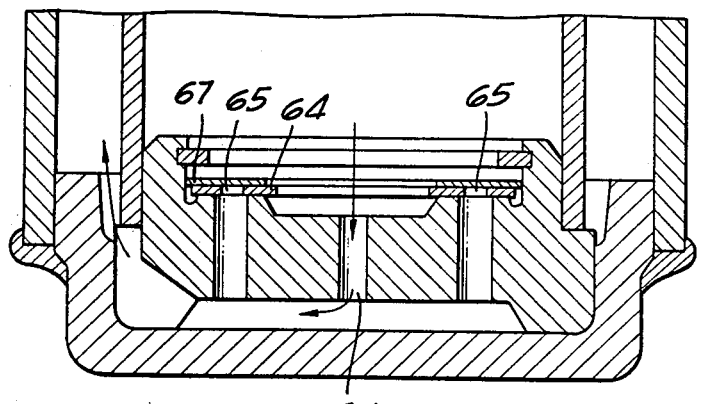
FIG. 20 is a view similar to FIG. 19 showing the directions of oil flow during the compression stroke.

In the modified form of foot valve shown in FIGS. 18, 19 and 20 the check valve 64 is provided with a plurality of larger orifices 65 and the foot valve body is provided with a small orifice 66. A check valve spring 67 is selected for suitable loading characteristics so that any desired piston speed can be established at which the damping operation begins. FIG. 19 shows the oil flow pattern during the rebound stroke of the piston. FIG. 20 shows how the check valve spring 67 is deflected by pressure of the oil flow when the piston moves rapidly on the compression stroke. The check valve spring 67 flattens to cover and close the large orifices 65 in the check valve 64, thereby forcing the oil to flow through the smaller orifice 66 in the foot valve body.

Having fully described the invention, it is to be understood that it is not to be limited to the details herein set forth but that the invention is of the full scope of the appended claims.

What is claimed is:

1. In a hydraulic shock absorber, the combination of: a cylinder, a piston mounted to slide in said cylinder and having a plurality of passages extending axially therethrough, a check valve plate having at least one first orifice in communication with at least one and not all of said plurality of passages at a first end of said piston, a plurality of flexible valve plates held in axial alignment at a second end of said piston, said plurality of flexible plates each having at least one second orifice in mutual register and in communication with each said passage in communication with at least one said first orifice, said flexible plates being progressively more flexible away from said piston and said second orifices being progressively smaller away from said piston.

2. The combination of claim 1 further including a first check valve spring biasing said flexible plates toward said piston, said check valve spring being of sufficient flexibility to allow said flexible plates to move away from each said passage in register with at least one said first orifice such that at least said first orifice controls the hydraulic damping rate for high range piston velocity.

3. The combination of claim 2 wherein said first check valve spring extends to hold said flexible plates at an inner periphery thereof such that said flexible plates move axially away said piston with said first check valve spring.

4. The combination of claim 2 wherein said first check valve spring extends to resist flexure by said flexible plates away from said piston, said piston further includes a retaining member on said second side thereof, said retaining member rigidly fixing an inner periphery of said flexible plates against said piston.

5. The combination of claim 1 wherein said plurality of said flexible plates includes a sufficient number thereof to avoid sharp changes in the damping characteristics curve of the hydraulic shock absorber.

6. The combination of claim 5 wherein said plurality of flexible plates includes three such plates.

7. The combination of claim 1 wherein each of said plurality of flexible plates includes three second orifices.

8. The combination of claim 1 further including a second check valve spring biasing said check valve plate against the first side of said piston.

9. The combination of claim 1 further including a reservoir tube encircling said cylinder and defining an annular reservoir for oil therebetween, and a foot valve assembly at one end of said cylinder controlling oil flow between said annular reservoir and the space within said cylinder between said piston and said foot valve assembly.

10. In a hydraulic shock absorber, the combination of: a cylinder, a piston mounted to slide in said cylinder and having a plurality of passages extending axially therethrough, a plurality of flexible valve plates held in axial alignment at a second end of said piston, said plurality of flexible plates each having at least one second orifice, said second orifice in each said plate being mutually aligned and in communication with at least one of said plurality of passages, said flexible plates being proressively more flexible away from said piston and said second orifices being progressively smaller away from said piston, and a first check valve spring biasing said flexible plates towards said piston, said first check valve spring extending to hold said flexible plates at an inner periphery thereof such that said flexible plates move axially away from said piston with said first check valve spring during high range piston velocities.

11. The combination of claim 10 further including a check valve plate having at least one first orifice in communication with at least one and not all of said plurality of passages at a first end of said piston, said second orifices being in communication with each said passage in communication with at least one said first orifice.

* * * * *

UNITED STATES PATENT AND TRADEMARK OFFICE
CERTIFICATE OF CORRECTION

PATENT NO. : 4,203,507
DATED : May 20, 1980
INVENTOR(S) : Takao Tomita et al

It is certified that error appears in the above-identified patent and that said Letters Patent are hereby corrected as shown below:

Column 1, line 58, "II" should read "I".

Column 7, line 23, insert "from" after "away".

Column 8, line 21, "prores-" should read "progres-".

Signed and Sealed this

Twelfth Day of August 1980

[SEAL]

Attest:

SIDNEY A. DIAMOND

Attesting Officer     Commissioner of Patents and Trademarks